(12) United States Patent
Steenson (10) Patent No.: US 7,862,111 B2
(45) Date of Patent: Jan. 4, 2011

(54) ADJUSTABLE WORK SURFACE

(76) Inventor: Daniel V Steenson, 1546 N. Ellington Way, Eagle, ID (US) 83616

( * ) Notice: Subject to any disclaimer, the term of this patent is extended or adjusted under 35 U.S.C. 154(b) by 920 days.

(21) Appl. No.: 11/382,337

(22) Filed: May 9, 2006

(65) Prior Publication Data

US 2006/0192415 A1    Aug. 31, 2006

Related U.S. Application Data (63) Continuation-in-part of application No. 11/281,572, filed on Nov. 16, 2005, and a continuation-in-part of application No. 11/250,654, filed on Oct. 13, 2005, now Pat. No. 7,216,930, and a continuation-in-part of application No. 10/921,540, filed on Aug. 18, 2004, now Pat. No. 7,131,688.

(60) Provisional application No. 60/756,682, filed on Jan. 5, 2006.

(51) Int. Cl.
*A47B 39/00* (2006.01)

(52) U.S. Cl. .................. 297/161; 297/188.2; 108/157.1

(58) Field of Classification Search ................. 297/161, 297/160, 188.01, 188.2, 188.18; 108/42, 108/44, 157.1, 157, 134, 50.01, 43; 248/346.01, 248/918, 118.1
See application file for complete search history.

(56) References Cited

U.S. PATENT DOCUMENTS

| | | | |
|---|---|---|---|
| 3,632,162 A | 1/1972 | Trethaway | |
| 3,968,992 A | 7/1976 | Hogan | |
| 4,040,665 A | 8/1977 | Wallace et al. | |
| 4,145,020 A | 3/1979 | Webster | |
| 4,216,994 A | 8/1980 | Benoit | |
| 4,730,869 A | 3/1988 | Schumacher | |
| 4,779,922 A | 10/1988 | Cooper | |
| 5,037,157 A | 8/1991 | Wain et al. | |
| 5,169,210 A | 12/1992 | Fricano | |
| 5,272,955 A | 12/1993 | Bond et al. | |
| 5,311,210 A | 5/1994 | O'Brien et al. | |
| 5,358,766 A * | 10/1994 | Field | 428/77 |
| 5,485,793 A * | 1/1996 | Crowell | 108/44 |
| 5,490,710 A | 2/1996 | Dearing et al. | |
| 5,505,412 A | 4/1996 | Van Hamme | |
| 5,533,697 A * | 7/1996 | Fletcher et al. | 248/146 |
| 5,651,586 A | 7/1997 | Groth | |
| 5,653,499 A | 8/1997 | Goodall | |

(Continued)

OTHER PUBLICATIONS

International Search Report for PCT/US2007/60165.

(Continued)

*Primary Examiner*—David Dunn
*Assistant Examiner*—Erika Garrett
(74) *Attorney, Agent, or Firm*—Buchanan Nipper (57) ABSTRACT

A multi-functional adjustable tray that mounts on the arm of a chair to provide a comfortably accessible work surface to support a computer mouse and other IO devices. The adjustable tray may be easily mounted to an arm of a chair and provides width, length, rotation, and storage adjustments. The adjustable tray includes a platform that is pivotally connected to an armchair stop. The armchair stop may be supported by adjustable guides that may be secured to the chair arm by a compression element. The tray may include one or more rotatable joints to allow the platform or IO devices to be tilted to a comfortable working angle.

16 Claims, 11 Drawing Sheets

U.S. PATENT DOCUMENTS

| | | | |
|---|---|---|---|
| 5,655,743 A * | 8/1997 | Gillis .................... 248/346.01 |
| 5,660,432 A | 8/1997 | Davis |
| 5,803,416 A * | 9/1998 | Hanson et al. .............. 248/118 |
| 5,884,976 A | 3/1999 | Breen et al. |
| 5,893,607 A * | 4/1999 | Trimnell ..................... 297/170 |
| 5,909,922 A | 6/1999 | Dugas et al. |
| 6,045,179 A * | 4/2000 | Harrison .................. 297/188.2 |
| 6,059,357 A * | 5/2000 | Peart ......................... 297/173 |
| 6,123,387 A | 9/2000 | Kelly |
| 6,154,690 A | 11/2000 | Coleman |
| 6,170,405 B1 * | 1/2001 | Weitzman et al. ............. 108/25 |
| 6,187,398 B1 * | 2/2001 | Eldridge .................... 428/35.2 |
| 6,220,658 B1 | 4/2001 | Lukawski et al. |
| 6,264,150 B1 * | 7/2001 | Kolenchuk .................. 248/118 |
| 6,264,272 B1 | 7/2001 | Jones et al. |
| 6,305,652 B1 * | 10/2001 | Borke et al. ................. 248/174 |
| 6,314,891 B1 | 11/2001 | Larson |
| 6,352,303 B1 * | 3/2002 | Hope .................... 297/188.18 |
| 6,354,658 B1 | 3/2002 | Sher et al. |
| 6,357,703 B1 * | 3/2002 | DiOrio ....................... 248/118 |
| 6,375,257 B1 | 4/2002 | Wooding et al. |
| 6,474,614 B2 * | 11/2002 | MacEachern ............ 248/349.1 |
| 6,604,472 B2 * | 8/2003 | McNeil ....................... 108/42 |
| 6,648,282 B1 * | 11/2003 | Sykes ......................... 248/118 |
| 6,655,647 B1 * | 12/2003 | Williams ............... 248/346.01 |
| 6,827,405 B1 | 12/2004 | Roberts |
| 6,837,539 B1 | 1/2005 | Casey |
| 6,935,683 B1 | 8/2005 | Brown |
| 6,971,624 B2 * | 12/2005 | Kollar et al. ............. 248/274.1 |
| 7,121,214 B1 * | 10/2006 | Toltzman et al. ............. 108/43 |
| 2003/0112147 A1 * | 6/2003 | George et al. ............ 340/691.6 |
| 2004/0202854 A1 * | 10/2004 | Esparza .................. 428/314.4 |

OTHER PUBLICATIONS

International Search Report for PCT/US2005/043802.

\* cited by examiner

ADJUSTABLE WORK SURFACE

CROSS-REFERENCE TO RELATED APPLICATIONS

This application is a continuation-in-part application of pending application, entitled ADJUSTABLE ARMCHAIR TRAY, filed by Daniel V. Steenson on Nov. 16, 2005, with application Ser. No. 11/281,572, which is a continuation-in-part application of pending application, entitled ADJUSTABLE ARMCHAIR TRAY, filed by Daniel V. Steenson on Oct. 13, 2005, with application Ser. No. 11/250,654, which is a continuation-in-part application claiming the priority date from the pending utility application entitled ADJUSTABLE ARMCHAIR MOUSE TRAY, filed by Daniel V. Steenson on Aug. 18, 2004 with application Ser. No. 10/921,540. This application also claims priority to provisional application entitled COMPUTER WORK SURFACE, filed by Daniel V. Steenson on Jan. 5, 2006 with application Ser. No. 60/756,682. These applications are incorporated herein by these references.

FIELD OF THE INVENTION

The present invention generally relates to the field of computer accessories. More particularly, the present invention provides an adjustable tray that may be easily mounted to the arm of a chair to provide a generally planar working surface to support a computer mouse and other accessories, devices and objects.

BACKGROUND OF THE INVENTION

Computers are operated through the use of peripheral systems and devices such as a keyboard, roller mouse or optical mouse, pen, joystick, keyboard, keypad, roller ball, trackball, personal digital assistant, cell phone, or similar device or other device, referred to collectively as "Input-Output" (IO) devices. IO devices enable a user to interact with a computer or network to send or receive information, make decisions, and carry out various other functions. Direct physical contact with, and therefore close proximity to, these devices are essential to their operation.

However, in most circumstances a computer user works at a desk and leans forward or sideways from a comfortable sitting position to reach a keyboard or mouse on a desk or other flat surface. Reaching for the keyboard or the mouse in this way makes it very difficult to maintain proper posture and operate the computer comfortably. Use of IO devices on a desktop stresses the back, shoulder and the wrist. For wrist stress and carpal tunnel syndrome, numerous products, such as ergonomically shaped mice and wrist supports, attempt to address the symptoms of this stress without addressing the awkward positioning that often causes strain.

Additionally, persons with debilitating injuries may find that reaching to a desk to use IO devices is difficult or painful. Accordingly, there is a need for a surface for supporting one or more IO devices that maintains a position so that the user may maintain ergonomically correct posture and wrist position.

The purpose of the foregoing Abstract is to enable the United States patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention, which is measured by the claims, nor is it intended to be limiting as to the scope of the invention in any way.

Features of the present invention will become readily apparent to those skilled in this art from the following detailed description, wherein only the preferred embodiments of the invention will be described and shown, simply by way of illustration of the best modes contemplated to manifest the invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

While the invention is susceptible to various modifications and alternative constructions, certain illustrated embodiments thereof have been shown in the drawings and will be described below in detail. It should be understood, however, that there is no intention to limit the invention to the specific forms disclosed; on the contrary, the invention is to cover all modifications, alternative constructions, and equivalents falling within the spirit and scope of the invention as defined in the claims.

Figure 1:
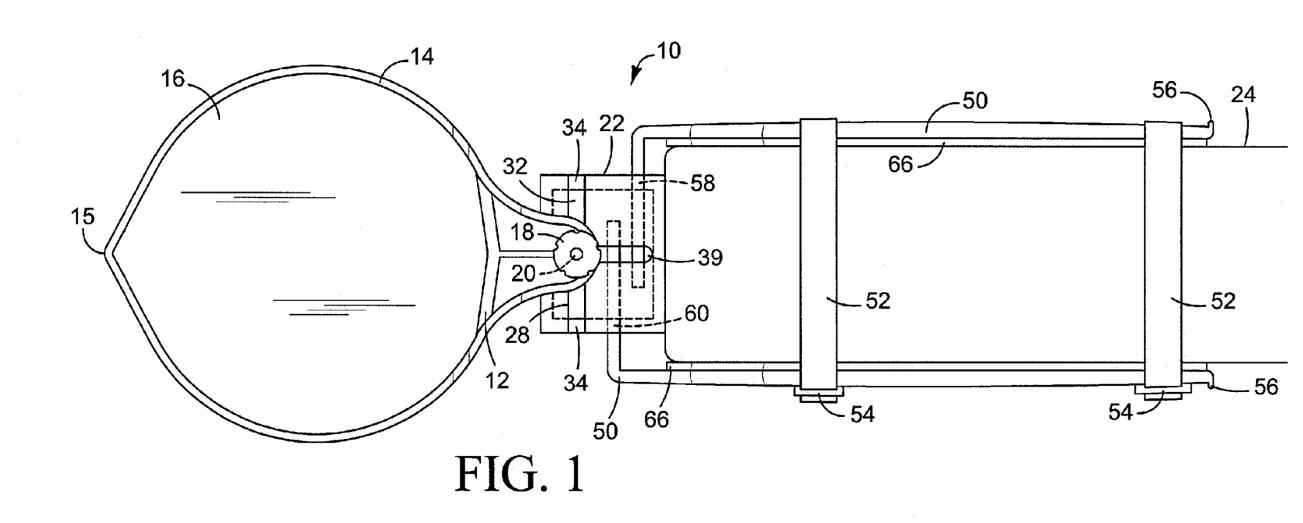
FIG. 1 is a top view of an embodiment of an armchair tray.

FIG. 1 shows a top view of an embodiment of the adjustable tray 10. The adjustable tray 10 includes a platform 12, which provides a generally planar surface for IO devices and other writing utensils. Additionally, the platform 12 may be used to write notes, secure a remote control, hold food or a beverage, or facilitate other similar uses. The adjustable tray 10 may be used on any device or location that is equipped with a chair arm or substantially equivalent structure. For example, many automobile seats are now equipped with armrests that the adjustable tray 10 would easily adapt to fit for the previously mentioned uses.

The shape defined by the perimeter of platform 12 may vary with the application, including square, rectangular, circular, or other shapes. The chairs to which the adjustable tray 10 may be attached are often mounted on rollers. In normal operation, the user may roll the chair and cause the platform 12 to contact a desk or other external object. To avoid being captured between the external object and the chair arm, the perimeter of the platform 12 may be shaped generally as an oval or an ellipse in some embodiments, and preferably modified by a peak 15. Peak, in this context, means a region of the perimeter that converges more sharply than an oval or ellipse. The overall oval shape of the platform 12 allows the platform 12 to rotate to either side of the chair arm and slide along the object as the object gently pushes it aside. The peak 15 ensures that the platform 12 swings to one side or the other, rather than being captured along the long axis of the chair arm. The perimeter of the platform 12 need not be perfectly elliptical; rather, the perimeter of the platform 12 preferably curves smoothly along the sides, and curving more sharply on the end.

The platform 12 and other parts of the adjustable tray 10 may be built or molded of any material that allows for strength and ease of use such as wood, plastic or other similar materials. The platform 12 may incorporate at least one retainer 14, preferably located around the periphery of the platform 12, to allow a mouse pad, or other devices to be retained within the perimeter of the platform 12. The retainer 14 provides a boundary that prevents IO devices or other materials from falling off the platform 12. In some embodiments, one or more discrete retainers 14 may be placed on all sides of the platform 12 to assure that a device does not fall off any side of the platform 12.

A pad 16 or other similar material may be positioned on top of the platform 12 and configured to be easily replaced when worn out. The pad 16 is preferably made of materials similar to those used for basic stand-alone computer mouse pads, typically neoprene with a nylon coating. Additionally, the pad 16 may be rubber, plastic, nylon, hook and loop fastener, or other material that facilitates the operation of an IO device. To prevent the pad 16 from falling when the platform 12 is placed in a stored or disengaged position, pad 16 may be held in place by adhesive or restraining tabs (not shown) protruding from the retainer 14. In other embodiments, the pad retainers may be a molded part of the platform 12, or clamps, tie downs, hook and loop fasteners, snaps or other elements may be used to maintain the correct positioning of the pad 16 on the platform 12.

In some embodiments of the present invention, IO devices may be rigidly attached to the platform 12, eliminating the need for retainer 14. Alternatively, the platform 12 may be integrated with the case of the IO device, so that the platform 12 and the IO device are presented to the user as a unit.

Figure 9:
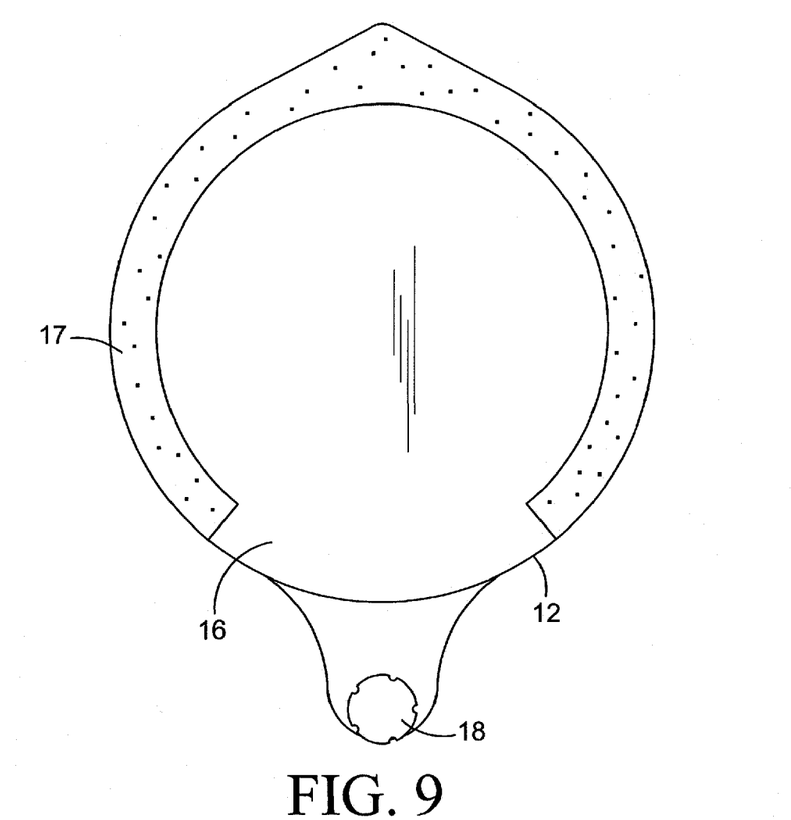
FIG. 9 is a top view of an embodiment of a platform for supporting an IO device.
Figure 10:
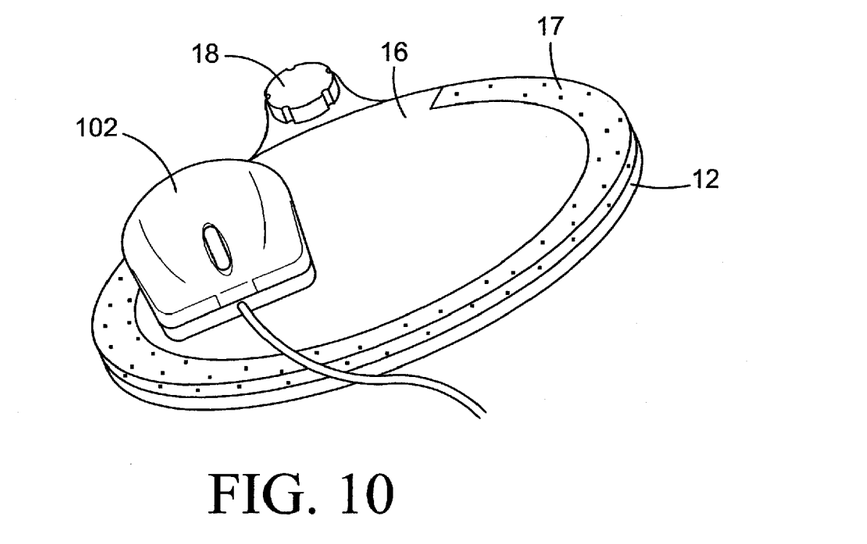
FIG. 10 is a perspective view of the platform of FIG. 9.

FIGS. 9 and 10 depict an embodiment with an alternative retainer assembly. Retaining strip 17 is placed around pad 16 and attached to platform 12. While FIG. 9 shows pad 16 and retaining strip 17 attached to platform 12 with an adhesive, in other embodiments pad 16 and retaining strip 17 may be affixed to platform 12 with an adhesive, clips, or retaining tabs. Retaining strip 17 presents a relatively high friction surface to the IO device, such as a computer mouse, so that the IO device is prevented from easily sliding off the surface of pad 16. High friction in this context means a higher friction coefficient than the coefficient of friction between pad 16 and the IO device. Coefficient of friction is a scalar value that describes ratio of the force of friction between two bodies (in this case, between the IO device and pad 16 or retaining strip 17) and the force pressing the bodies together.

In some embodiments, the top surface of retaining strip 17 is level with the top surface of pad 16, so an IO device may slide or roll partway onto retaining strip 17. In many applications, this will present a progressively increasing resistance to the user of the IO device as the user moves the IO device near the edge of platform 12. In some embodiments, retaining strip 17 is level with the pad 16 along the boundary between retaining strip 17 and pad 16, and retaining strip 17 gets progressively thicker as it approaches the perimeter of platform 12 along a radial line extending roughly from the center of platform 12 to the perimeter of platform 12; in other words, retaining strip 17 is thicker along the edge of platform 12 than it is next to pad 16. In the embodiment shown in FIG. 9, retaining strip 17 does not completely encircle pad 16, leaving a region open near the user's wrist to extend the usable area for a mouse or similar IO device. In other embodiments, retaining strip 17 completely encircles pad 16.

In a related embodiment, retaining strip 17 may be constructed of hook and loop material, such as Velcro®, which may be used to retain an IO device such as a keyboard. For example, retaining strip 17 may be constructed of the loop side of the material, and one or more strips of the hook side may be attached to the bottom of a keyboard. The keyboard may be placed on platform 12 so that the hook material engages the loop material, preventing the keyboard from sliding on the surface of platform 12. In this way, the keyboard is securely attached to platform 12 for use, but easily removed to use platform 12 for another purpose or to allow the user to exit the armchair. In this embodiment, retaining strip 17 may completely encircle pad 16 or may leave an open region as shown in FIG. 9.

FIG. 10 illustrates that a mouse 102 or similar IO device is retained by retaining strip 17 when platform 12 is tilted to the side. Embodiments of platform 12 may be used in applications other than a removable armchair tray as depicted in FIGS. 1 through 8. For example, platform 12 may be used on a slide-out keyboard drawer found on some desks, or on ergonomic keyboard and mouse supports. The embodiments shown in FIGS. 9 and 10 are particularly useful in the applications where the IO device is supported by tiltable structure, as often found on ergonomic keyboard supports.

Referring again to FIG. 1, a movable fastener 18 passes through a hole 20 in the platform 12, pivotally securing the platform 12 to an armchair stop 22. The movable fastener 18 may be a threaded nut and bolt, a pin connection with a threaded end for tightening purposes, or any other element that provides a rotational pivot for the angular adjustment of the platform 12, while still interconnecting the platform 12 with the armchair stop 22. In the embodiment of movable fastener 18 shown in FIG. 4, the movable fastener 18 includes a threaded bolt 40. Threaded nut 42 screws onto the shank of bolt 40, capturing the platform 12 between threaded nut 42 and the head 44 of bolt 40. Tightening the nut 42 secures the platform 12 and prevents it from rotating; loosening nut 42 slightly releases the platform 12 enough to allow rotation to a comfortable position.

Figure 4:
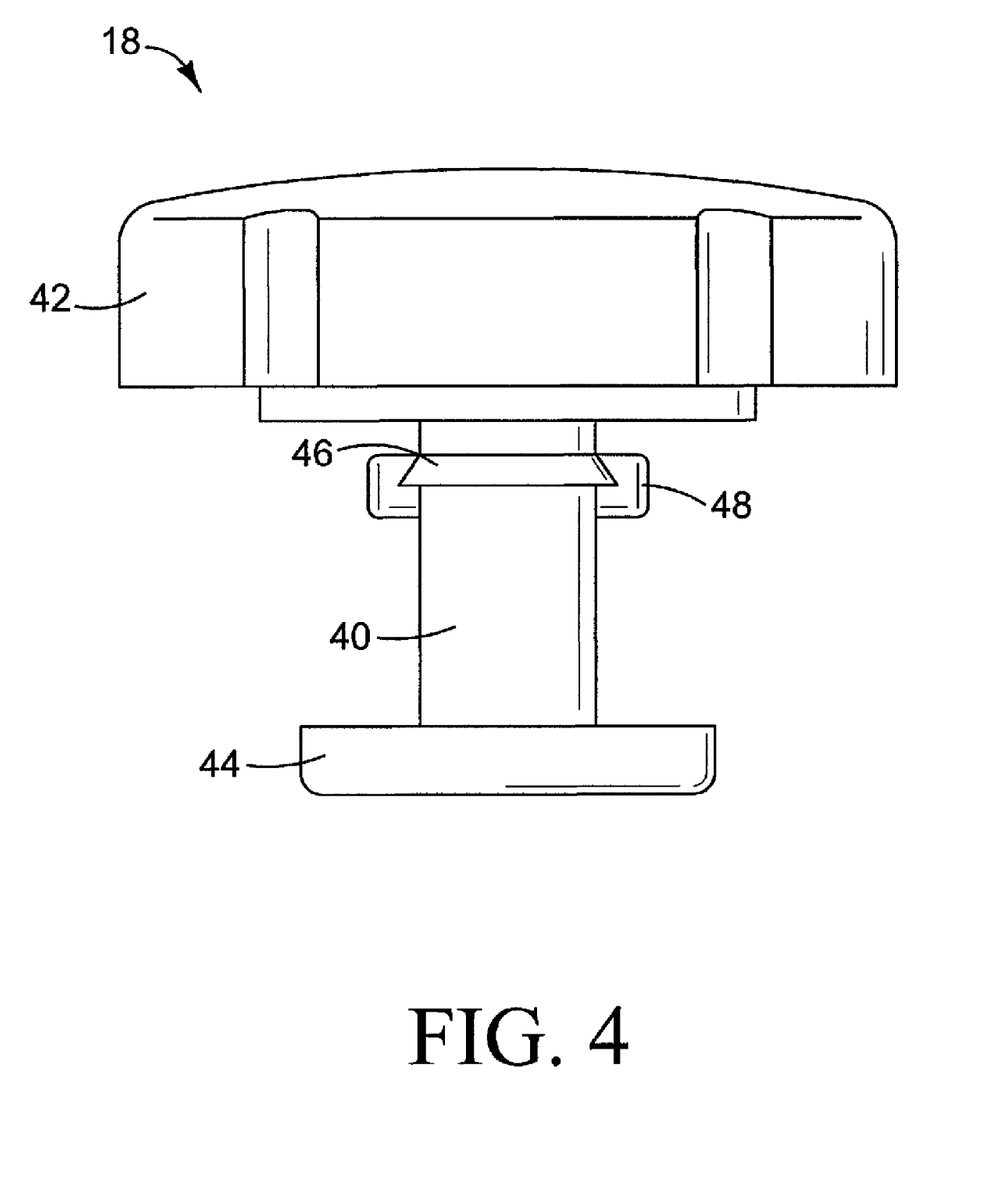
FIG. 4 shows an embodiment of a movable fastener.

The movable fastener 18 is preferably ergonomically designed or covered so that it does not interfere with the user during use of devices on the adjustable tray 10. This may be accomplished by incorporating a rounded or other shape that allows it to be easily tightened while simultaneously maintaining user comfort. Rounded, in this context, means that the nut 42 has no sharp edges exposed to the user when installed.

Figure 2:
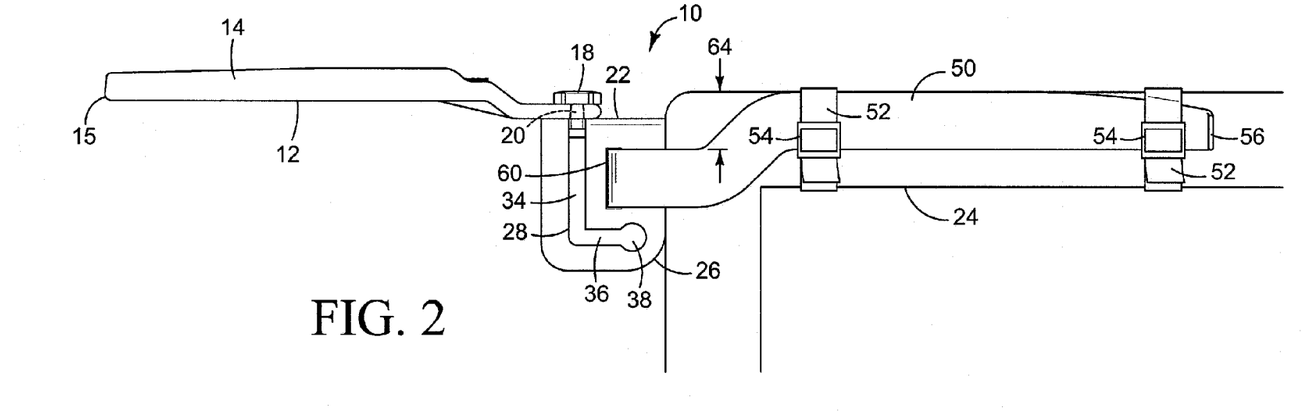
FIG. 2 is a side view of the embodiment of FIG. 1, as mounted on a chair arm.

Referring now to FIG. 2, a side view of the embodiment of FIG. 1, the armchair stop 22 is shaped to be positioned directly against a chair arm 24 while preventing the platform 12 from sliding toward the back of the chair. On some chairs, that position will be where the armrest transitions from horizontal to vertical. The adjustable tray 10 will also work on different styles of arms and chairs with the only general compatibility requirement being that the chair has an armrest equivalent. The armchair stop 22 has a curved or slanted region 26 to accommodate any curvature of chair arm 24. When the region 26 of armchair stop 22 abuts the chair arm 24, the chair arm 24 provides additional support to the adjustable tray 10.

In a preferred embodiment, the platform 12 is constructed on two levels: a first level that supports an IO device, and a second level lower than the first level through which the fastener 18 passes. This two-tier structure allows the first level to be generally level with the chair arm, so that the user's wrist is approximately straight when using the input device without interference by the movable fastener 18. Optionally, a wrist pad or cover (not shown) may be placed on the second level to help support the user's wrist.

Figure 3:
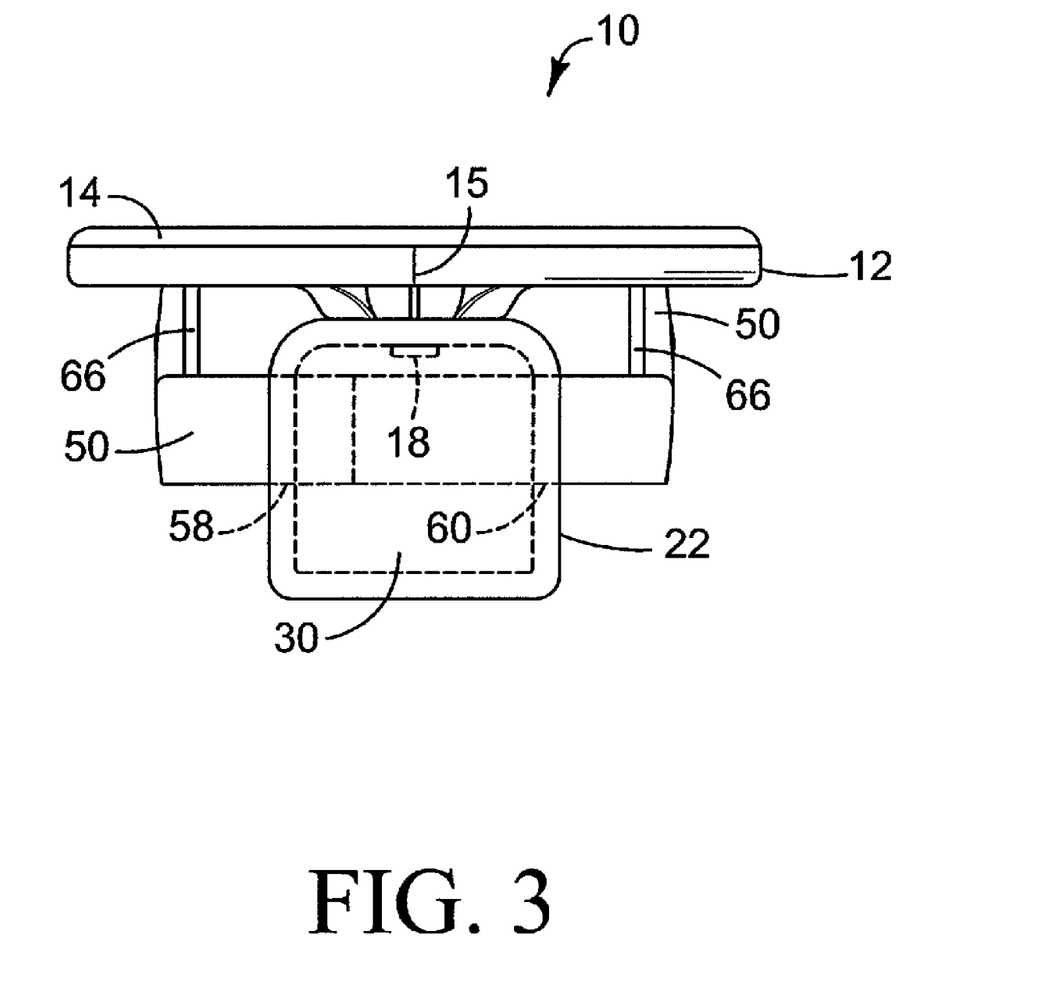
FIG. 3 is a front view of the embodiment of FIG. 1.

FIG. 3 is a front view of the embodiment shown in FIG. 1. Referring to FIGS. 1, 2, and 3, the movable fastener 18 flexibly secures the platform 12 to armchair stop 22 by passing through the hole 20 in the platform 12, through a slot 28 in the armchair stop 22, and into a cavity 30 (FIG. 3) in armchair stop 22. The slot 28 in the armchair stop 22 has a generally horizontal top leg 32 (FIG. 1) having curved regions on each end and connecting to two generally vertical legs 34 on either side of armchair stop 22 (FIG. 2). The slot 28 has additional generally horizontal side legs 36 on either side of armchair stop 22, terminating in an enlarged region 38. The shape of slot 28 allows the platform 12 to be positioned on the top of armchair stop 22 for use, or positioned to either side of chair arm 24 by sliding the fastener 18 from horizontal leg 32 into one of vertical legs 34. Vertical legs 34 need not be precisely vertical: they may slope fore and aft or side-to-side to accommodate chair arms of various shapes. Similarly, horizontal side legs 36 need not be precisely horizontal.

As a result, a person may use the adjustable tray 10 with the platform 12 horizontal and then rotate the platform 12 and the movable fastener 18 within the slot 28 so that the platform 12 is in a vertical storage position. The transition is easily made by loosening the movable fastener 18 slightly, and then sliding the movable fastener 18 and the connected platform 12 within the slot 28 from the horizontal plane to the vertical plane. In another embodiment, the slot 28 has only one vertical leg 34 so that the platform 12 may be stored only on one side of the chair arm 24.

Referring to FIG. 2, the platform 12 may be removed from the armchair stop 22 by sliding the movable fastener 18 along the leg 36 of the slot 28 to enlarged region 38. Enlarged region 38 is sufficiently large to allow an end of movable fastener 18 to pass through, releasing the movable fastener 18 and the platform 12 from the armchair stop 22. In some embodiments, a top leg 39 connecting with slot 28 may be included to allow additional adjustability of the fore and aft position of platform 12.

The embodiment of the movable fastener 18 shown in FIG. 4 has a threaded bolt 40 and an ergonomically shaped threaded nut 42. Bolt 40 has a head 44 that is small enough to pass through enlarged region 38, yet still engage legs 32, 34, and 36 of slot 28. An embodiment of bolt 40 has a frustoconical ring 46 circumvolving the shank of bolt 40 and one or more bosses 48 protruding from the shank of bolt 40.

The hole 20 in the platform 12 may be sized to allow the bolt 40 with the ring 46 to pass through as a press fit. After the ring 46 passes through the hole 20 (FIG. 2), the bolt 40 is captured on the topside of the platform 12 by the ring 46 and on the bottom side by head 44, while still allowed to move a short distance in an axial direction. The hole 20 may optionally be made of a smaller diameter at the upper end, to allow the ring 46 to easily pass through during assembly, while still capturing the bolt 40 during operation. In another embodiment, annular ring may be replaced with one or more barbs.

One or more bosses 48 engage corresponding axial grooves or similar features in the hole 20 to prevent rotation of the bolt 40 relative to the platform 12 when the nut 42 is tightened, eliminating the need for a washer and facilitating tightening of the nut 42 to secure the platform 12. While the bosses 48 are depicted as cylinders, the bosses 48 may be of any shape that engages the grooves and prevents rotation, including a polyhedron or hemisphere.

The adjustable tray 10 further includes one or more guides 50 connected to the armchair stop 22. Viewed from above as shown in FIG. 1, the guides 50 are approximately L-shaped on each end, and one leg of each guide 50 is inserted into a hole 58 and a hole 60 in the armchair stop 22. Holes 58 and 60 are offset, permitting the legs inserted into the slot to be relatively long, accommodating both wide chair arms and narrow chair arms, where the legs overlap each other in the slots. In an embodiment shown in FIG. 5, the rear of the armchair stop 22 may include one or more recesses 62 sized to accommodate guides 50, allowing guides 50 to be adjusted to accommodate a chair arm 24 narrower than armchair stop 22.

Figure 5:
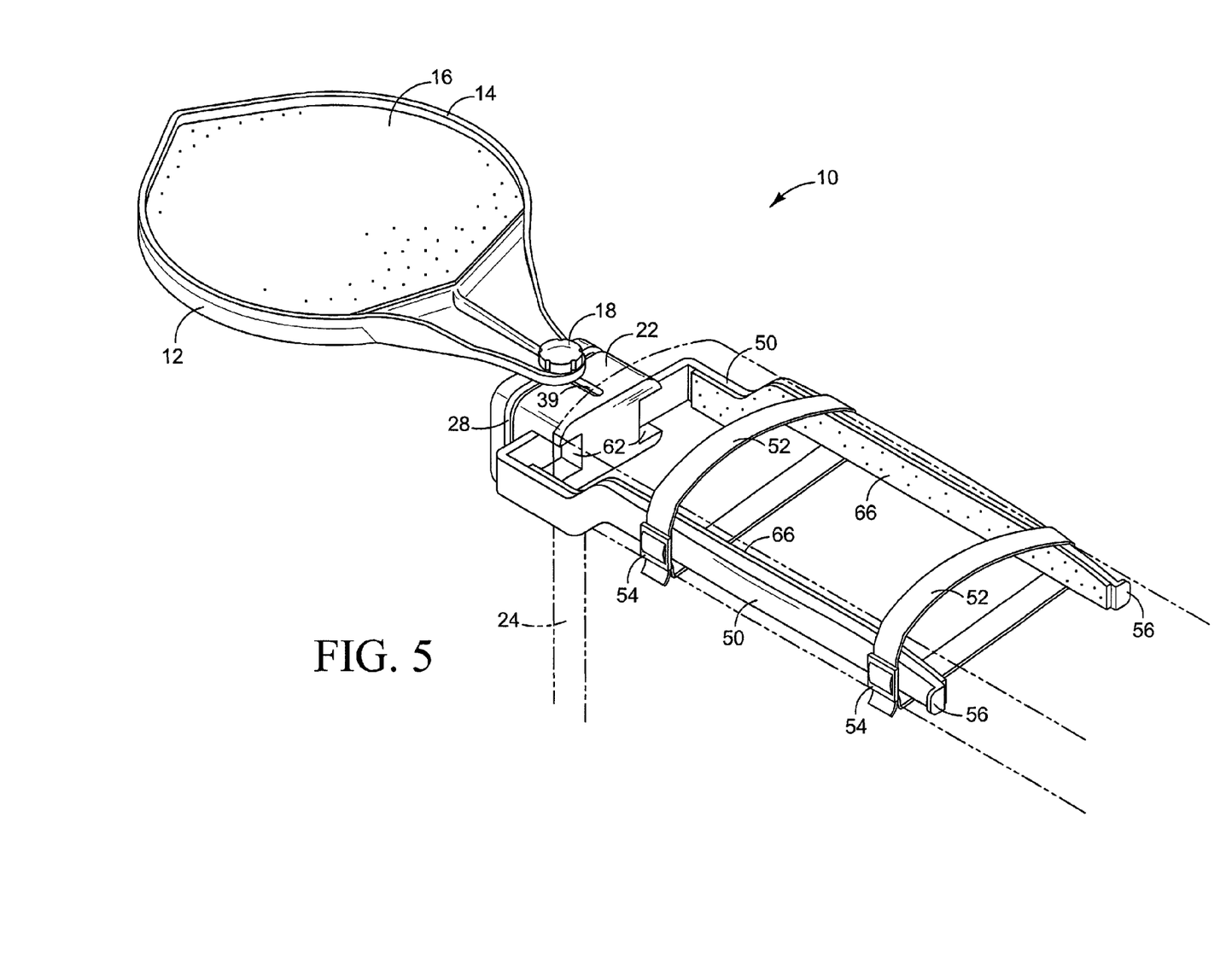
FIG. 5 is a perspective view of the embodiment of FIG. 1.

In a preferred embodiment depicted in FIG. 5, the guides 50 are compressed against the sides of the chair arm 24 by at least one securing device 52. The securing device 52 as herein defined includes, but is not limited to, a clamp, tape, bungee cords, string, tie cords, or straps. Each securing device 52 preferably passes around the chair arm 24 and guides 50 and is preferably fastened by a fastener 54. Fastener 54 may be a Velcro fastener, a Tabler buckle, a clip, or similar buckling device. The compressive force of the devices 52 presses the guides 50 against the chair arm 24 and into the armchair stop 22, effectively securing the adjustable tray 10. This embodiment provides the advantage of simplicity and allows the adjustable tray 10 to be quickly and easily mounted to the chair arm 24 with ease.

Another embodiment may include at least one strap slot or loop in each guide 50 in which to thread the securing devices 52 to compress and secure the guides 50 to the chair arm 24. The strap slots preferably run a substantial length of the guides 50 allowing the securing devices 52 to be slid or moved to accommodate the configuration of the chair arm 24 and particularly the support members.

In a preferred embodiment, the guides 50 each have a tab 56 on the end furthest from the armchair stop 22 to prevent securing devices 52 from slipping off the ends of guides 50. Guides 50 may also be tapered to better conform to curved chair arms.

Referring to FIG. 2, the guides 50 may curve downward in the region 64 nearest the armchair stop 22 so that the platform 12 is approximately level with the uppermost surface of guides 50. Without the curved region 64, the platform 12 would be positioned above the chair arm 24, causing the user's wrist to flex upward when using a mouse or other IO device, potentially causing carpal tunnel stress within the wrist. In another embodiment, a shallower or deeper curve positions the platform 12 above or below the chair arm 24, respectively, which may be comfortable for some users. Curved region 64 need not be smoothly curved in the S-shape shown; it may descend sharply in a Z-shape or with perpendicular angles.

Adjustable tray 10 may include multiple sets of guides 50, each set tapered, curved, and including features that best fit a class of chair arms. The user may then select the set of guides 50 that best fits the user's chair.

Figure 8:
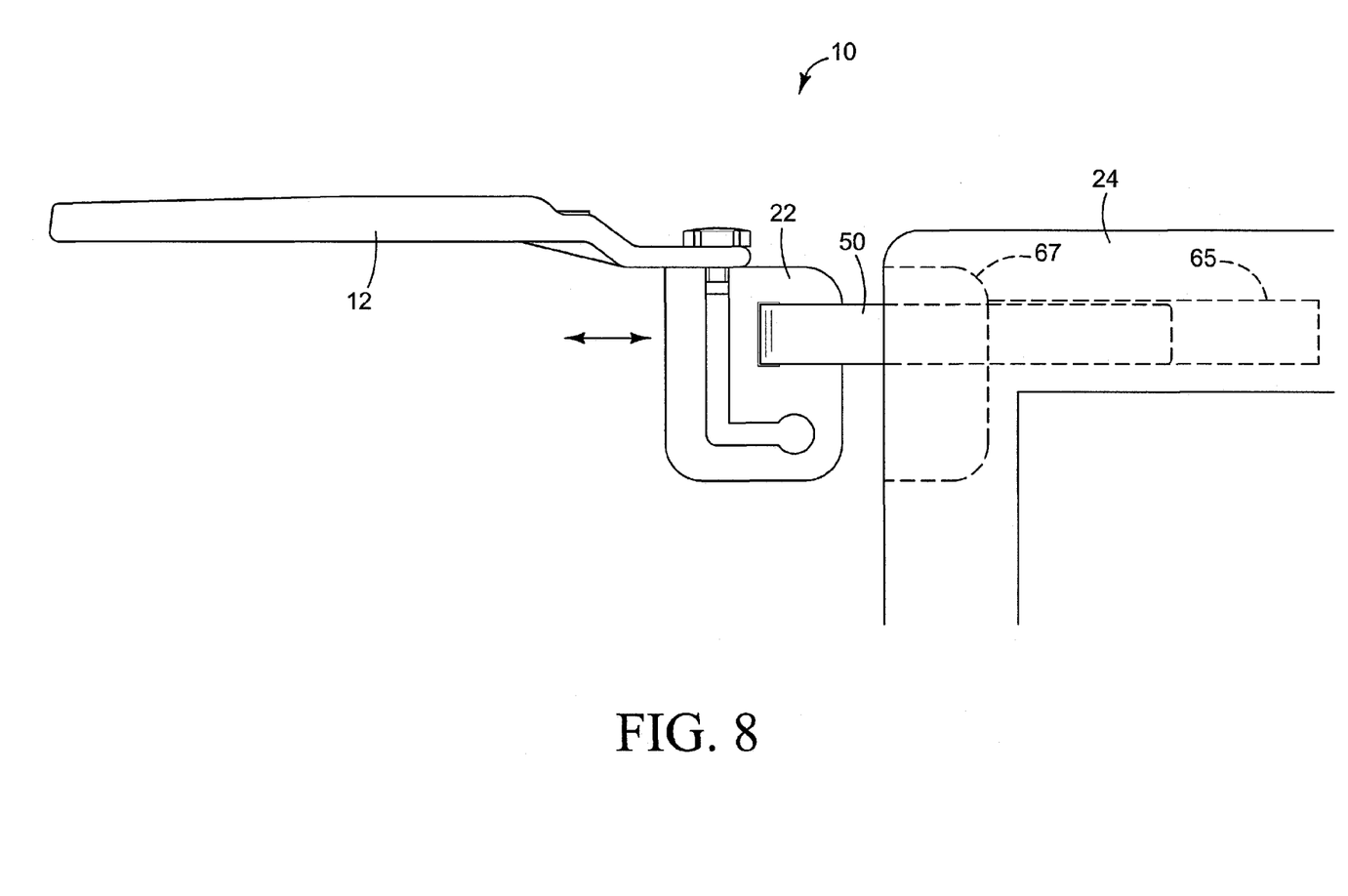
FIG. 8 is a side view of an embodiment of an armchair tray having a slideable guide.

In another embodiment, shown in FIG. 8, each guide 50 may be inserted into a corresponding cavity 65 in chair arm 24. The walls of the cavity 65 support the guide 50, which in turn supports the armchair stop 22. Each guide 50 may slide in and out of the cavity 65, allowing the user to place the platform 12 a comfortable distance away from the chair arm 24. In some embodiments, the chair arm 24 has an additional cavity 67, as shown in FIG. 8, adapted to accept the armchair stop 22, so that the armchair stop 22 may be retracted into the chair arm 24 and out of the way of the user. In some embodiments, only one guide 50 is required, because there is no need to adapt the adjustable tray 10 to fit the width of the chair arm 24.

Figure 6:
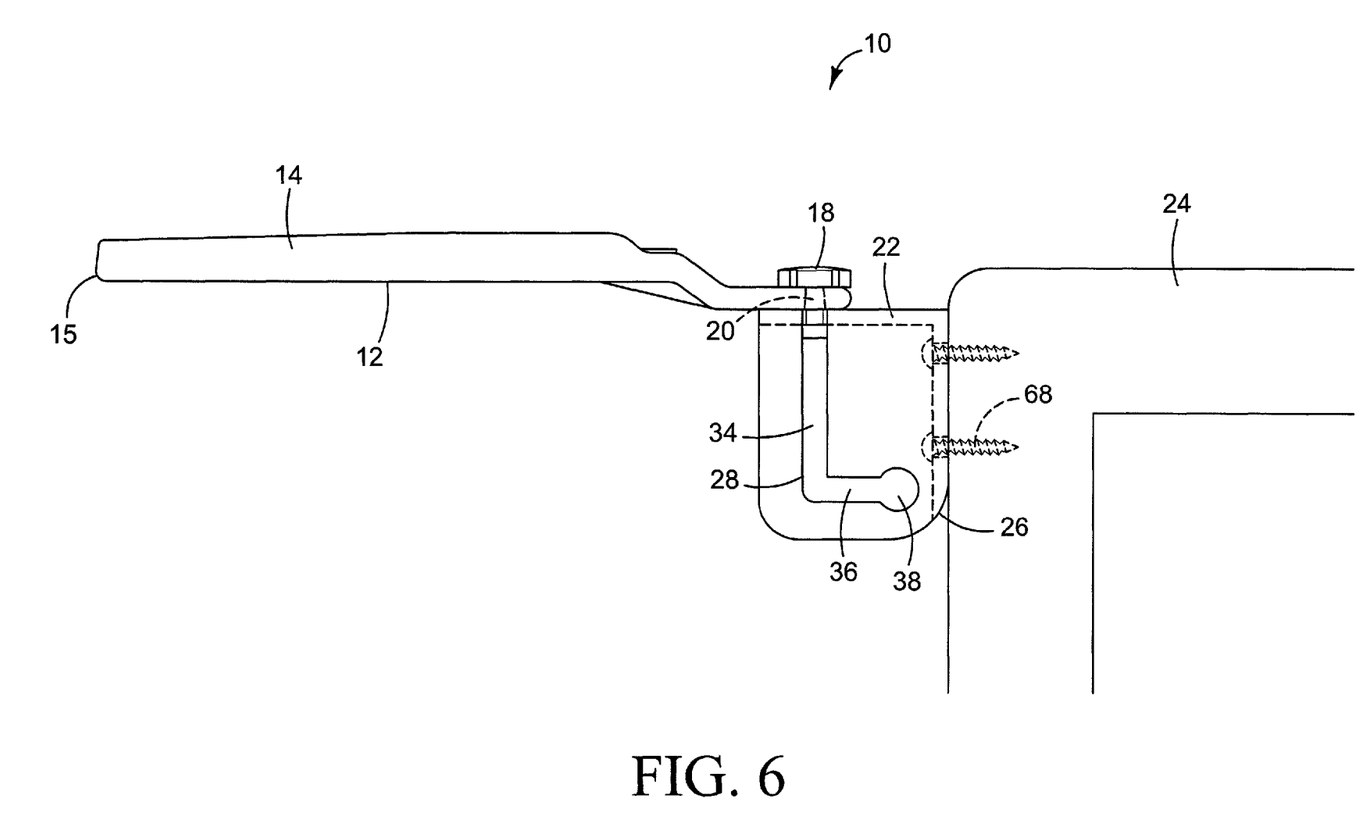
FIG. 6 is a side view of an embodiment of the invention where the armchair stop is secured directly to the chair arm.

Guides 50 may be eliminated by securing armchair stop 22 directly to chair arm 24, as shown in FIG. 6. Armchair stop 22 may be secured with one or more permanent fasteners 68, such as screws or glue, or removable fasteners, such as key and slot hangers. Using a key and slot hanger, one or more keys attached to armchair stop 22 engage slots in chair arm 24. Each slot has an enlarged region so that the key may be disengaged from the slot, allowing removal of the adjustable tray 10. It is preferable to install the slots on chair arm 24, rather than the key, so that the key does not protrude from chair arm 24 when armchair stop 22 is removed.

The armchair stop 22, the guides 50, and the securing devices 52 are preferably lined with a cushioning material 66, as shown in FIG. 1. The cushioning material 66 allows the guides 50 and the armchair stop 22 to be tightened against the surface of a chair without scratching or other marring of the chair. Cushioning material 66 also provides a non-slip surface that prevents movement during the use of the adjustable tray 10. Cushioning material 66 may be any material such as rubber, plastic or cloth that prevents slippage and marring of the arm of the chair. In a preferred embodiment, the cushioning material 66 is neoprene or other non-skid rubberized material used to form traditional stand-alone mouse pads.

Figure 7:
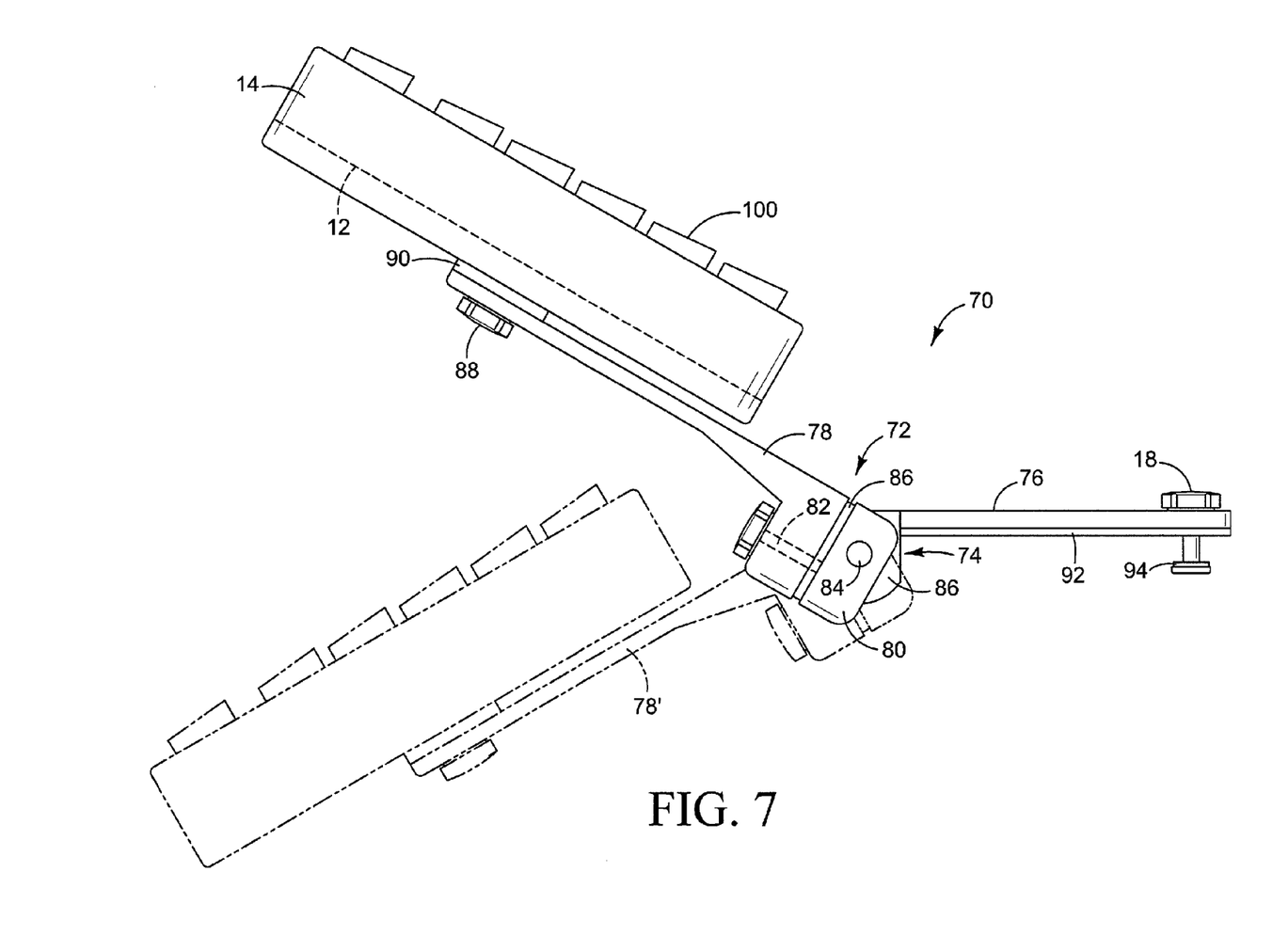
FIG. 7 is a side view of an embodiment of an armchair tray having a rotatable joint.

FIG. 7 shows an embodiment of the invention having rotatable joints that allow the platform 12 to be tilted to comfortably accommodate a user's hand and wrist position while using a keyboard or other IO device. In particular, a keyboard that is split into two parts, one for the left hand and one for the right hand, allows each keyboard segment to be rotated to fit the user's hand when the user's arm is resting on the chair arm or held comfortably above or to the outside of the chair arm. The left keyboard segment is preferably tilted or rotated counter-clockwise from the user's perspective; the right keyboard segment is preferably tilted or rotated clockwise. The angle of rotation varies with the user, the layout of the chair arm, and the size and configuration of the keyboard. Referring to FIG. 7, the platform 12 is attached to an arm 70 that is divided into three segments by a first rotatable joint 72 and a second rotatable joint 74. An inboard segment 76 of the arm 70 is attached to the armchair stop 22 by the movable fastener 18, and an outboard segment 78 of the arm 70 is attached to the platform 12. A middle segment 80 connects rotatable joints 72 and 74. In a preferred embodiment, the outboard segment 78 rotates on a first pin 82, and the middle segment 80 rotates about a second pin 84. FIG. 7 shows the outboard segment 78 in an exemplary first position where the user's wrist extends upward, and an exemplary second position where the user's wrist flexes downward, designated as 78'. The rotation of segment 78 about joint 74 is not limited to the positions shown and may extend to wider or narrower angles.

The outboard segment 78 may be prevented from rotating beyond the desired angle by static frictional contact between the middle segment 80 and the outboard segment 78. The static friction may be overcome by applying a manual moment to the outboard segment of the arm 70. The ease of rotation may be controlled by using a bolt, machine screw, or lag screw with a knurled head as the pin 82 so that the bolt may be tightened or loosened to control the friction between the segments. An optional rotational control device 86 may be used to control rotation, such as a rubber washer, fiber washer, toothed surfaces on segments 78 and 80, or other suitable rotation controlling device. Rotation of joint 74 may be controlled in a similar manner, including use of a rotation control device 86 between the surfaces of middle segment 80 and inboard segment 76.

The embodiment shown in FIG. 7 allows the platform to be rotated about the long axis of the arm 70 via rotatable joint 72. In other embodiments, the arm 70 or the joint 72 may be angled from the long axis of the arm 70 to allow the platform to rotate about an arbitrary axis. Alternatively, the rotatable joint 72 may be combined with a universal joint to increase flexibility when positioning the platform 12. It may also be recognized that some applications require only one rotatable joint, so that platform 12 has only one axis of rotation.

In some embodiments, the platform 12 is connected to the arm 70 by an adjustable fastener 88. The adjustable fastener 88 may be a bolt with a knurled head, a pin connection with a threaded end for tightening purposes, or any other element that provides a rotational pivot for rotational adjustment of the platform 12. A friction element 90 may be placed between the arm 70 and the platform 12 to prevent rotation of the platform 12 when the adjustable fastener 88 is tightened. The friction element 90 may be a rubber washer, fiber washer, star washer, or other frictional device capable of resisting the rotation of platform 12. Alternatively, the arm 70 may be permanently affixed to the platform 12.

While the rotatable joint 72 is particularly useful with keyboard applications, it is not limited to keyboard applications and may be used, by way of example, with other IO devices such as trackballs. In embodiments employing rotatable joint 72, it is preferable to insure that the size of the retainer 14 is adequate to retain the IO device when the platform 12 is tilted away from a level position. As shown in FIG. 7, the retainer 14 is sized to accommodate a keyboard 100.

FIG. 7 also shows an alternative embodiment for controlling the rotation of fastener 18. Flexible material 92 may be affixed to the inboard segment 76. The fastener 18 passes through the flexible material 92 so that the frictional contact with the material prevents easy rotation of the fastener 18. Flexible material 92 may also cushion the inboard segment 76 where it contacts the armchair stop 22 and may prevent rotation of the inboard segment 76 relative to the chair arm 24. Flexible material 92 may be neoprene, rubber, or similar material capable of lightly gripping the shank of fastener 18, frictionally preventing rotation of the inboard segment 76, or cushioning the inboard segment 76. Optionally, a friction element 94 may be placed on the shaft of fastener 18 so that it contacts armchair stop 22 when fastener 18 is tightened, as in FIG. 2. The friction element 94 may be a rubber washer, fiber washer, star washer, or other frictional device capable of resisting the rotation of fastener 18.

Figure 11:
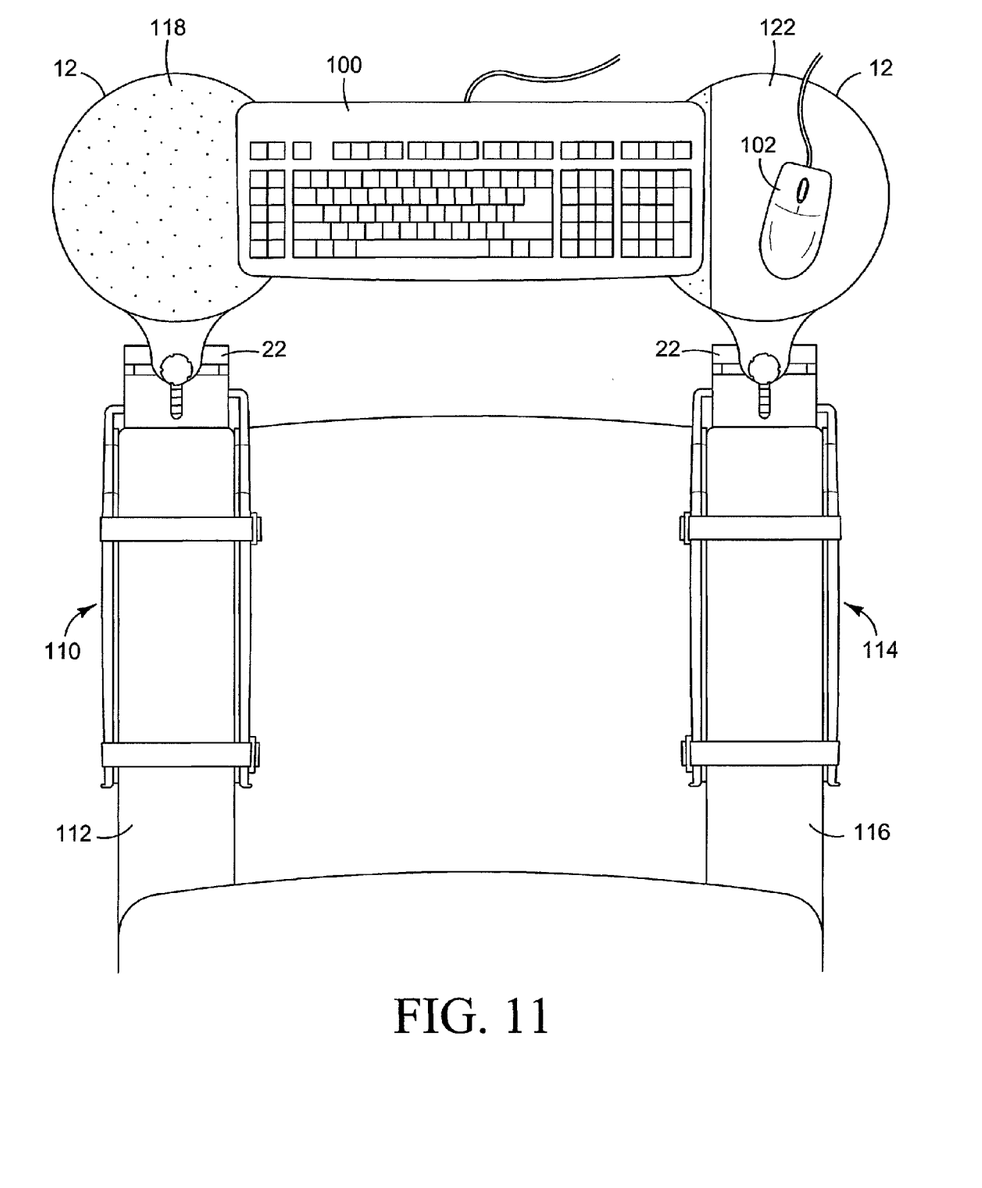
FIG. 11 depicts a method of supporting a keyboard using two embodiments of a platform.

Two armchair trays may be used to support a keyboard, as shown in FIG. 11. In this application, a first armchair tray 110 is attached to a left chair arm 112, and a second armchair tray 114 is attached to a right chair arm 116. The first armchair tray 110 is configured with a platform 12 with a top surface 118 having a high coefficient of friction. The second armchair tray 114 is configured with a platform 12 having a top surface divided into two regions: a high friction region 120 and a relatively smooth region 122 adapted for use with an IO device such as a mouse. A platform with a retainer assembly, as shown in FIGS. 9 and 10, may be used as an alternative to a platform 12 with its surface divided into two regions. A keyboard 100 may be placed on the two armchair trays so that it rests on top surface 118 and region 120, each of which have high coefficients of friction. Thus, keyboard 100 is supported in a manner that resists sliding off of the platforms 12. A mouse 102 or other IO device may be placed on smooth region 122.

Figure 12:
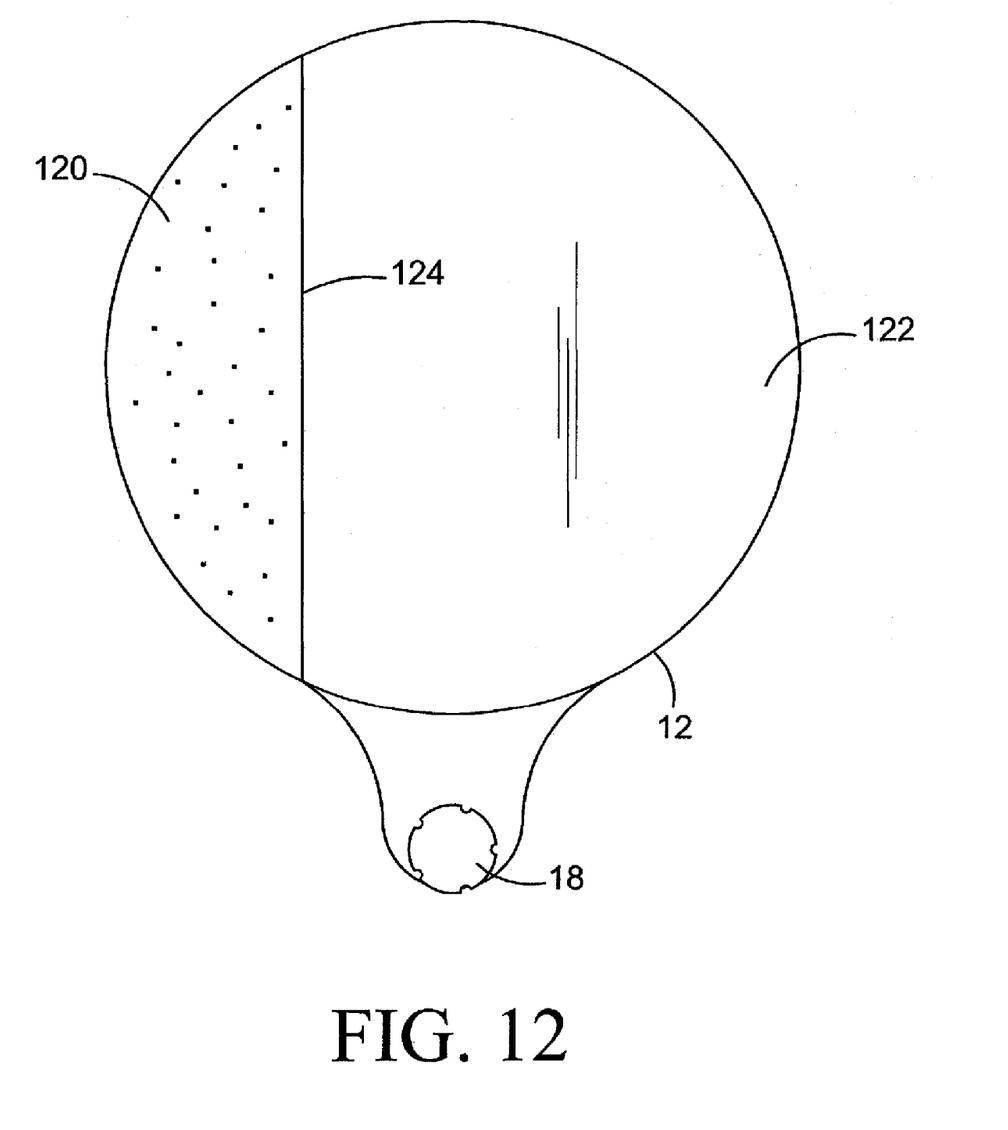
FIG. 12 depicts an embodiment of a platform for supporting two IO devices.

Platform 12 as installed on armchair tray 114 is depicted in more detail in FIG. 12. High friction region 120 abuts smooth region 122 along a boundary 124. In some embodiments, the top surface of region 120 and region 122 is even along boundary 124, meaning that there is no edge along boundary 124 presented to an IO device resting on the surface of platform 12. In some embodiments, the top surfaces of regions 120 and 122 are coplanar. In other embodiments, the surfaces of region 120 and 122 may be at different levels.

Figure 13:
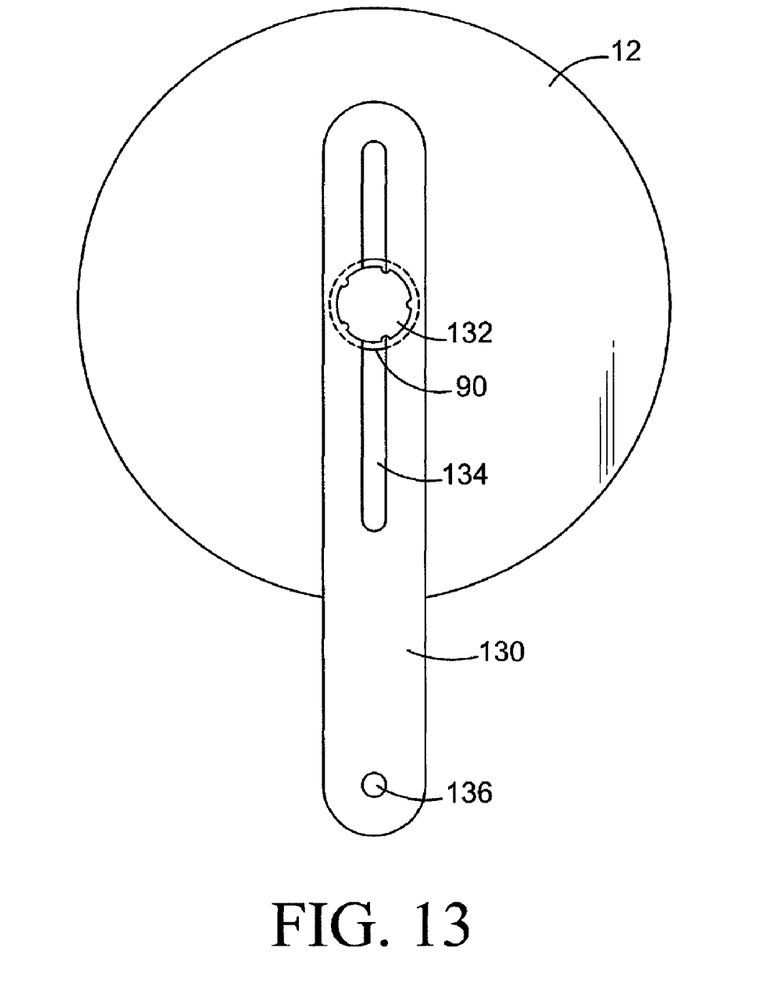
FIG. 13 is a bottom view of an embodiment of a platform and an embodiment of an arm for supporting the platform.
Figure 14:
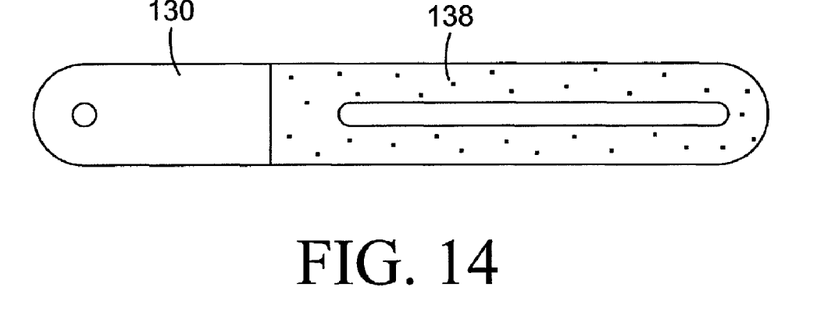
FIG. 14 is a top view of another embodiment of an arm.

An embodiment having more fore and aft adjustability is shown in FIGS. 13 and 14. Fore and aft adjustability, in this context, means capable of being adjusted in distance from the chair arm to the center of platform 12. FIG. 13 is a bottom view of platform 12 connected to an arm 130 with a rotational fastener 132. Rotational fastener 132 extends through slot 134 into platform 12. Slot 134 provides fore and aft adjustability. Movable fastener 18 (not shown) may extend through hole 136 to secure arm 130 to armchair stop 22 (not shown.)

Rotational fastener 132 may be tightened to prevent motion of platform 12 relative to arm 130. Rotational fastener 132 may be a threaded nut and bolt, a pin connection with a threaded end for tightening purposes, or any other element that provides a rotational pivot for the angular adjustment of the platform 12, while still interconnecting the platform 12 with outboard segment 78. Rotational fastener 132 preferably includes a knurled head so that it may be tightened or loosened by hand. In some embodiments, a friction element 90 may be placed between platform 12 and outboard segment 78 to assist in controlling rotation. In an alternative embodiment shown in FIG. 14, a top view of arm 130, a friction material 138 may be secured to arm 130 to prevent motion of platform 12 relative to arm 130. Friction material 138 may include, without limitation, rubber, or neoprene. In another embodiment, the surface of arm 130 may be roughened or treated to provide a high coefficient of friction.

While there is shown and described the present preferred embodiments of the invention, it is to be distinctly understood that this invention is not limited thereto, but may be variously embodied to practice within the scope of the following claims. From the foregoing description, it will be apparent that various changes may be made without departing from the spirit and scope of the invention as defined by the following claims.

What is claimed is:

1. A work surface, for use on a chair arm comprising:
    a platform defining a perimeter, said platform configured for tilting away from a level position said platform configured for fastening to said chair arm;
    a first surface disposed on the platform, the first surface having a first coefficient of friction;
    a second surface disposed on the platform abutting the first surface, said second surface disposed along at least three-quarters of said perimeter, the second surface having a second coefficient of friction different than the first coefficient of friction;
    whereby said first surface and said second surface are level and coplanar; and
    whereby said second surface has a greater coefficient of friction than said first surface, thereby enabling the second surface to resist sliding motion of an IO device when said platform is tilted away from a level position and thereby retain the IO device on the platform.

2. The work surface of claim 1, wherein the second surface is placed around said first surface and is disposed along the entire perimeter.

3. The work surface of claim 1, wherein said perimeter is generally circular in shape.

4. The work surface of claim 1, wherein the second surface encloses the first surface.

5. The work surface of claim 1, wherein the second surface comprises a material selected from the group of neoprene and hook and loop fastener material.

6. The work surface of claim 1, wherein the first surface comprises a resilient material.

7. The adjustable tray of claim 1, wherein the platform defines a perimeter shaped generally as an oval.

8. The adjustable tray of claim 7, wherein the perimeter defines a region converging more sharply than an oval, whereby the converging region tends to urge the platform aside when the platform comes in contact with an obstacle.

9. A method of supporting a first IO device and a second IO device, comprising the steps of:
    providing a first platform comprising a first surface, the first surface having a high coefficient of friction;
    providing a second platform; the second platform comprising a second surface having a high coefficient of friction and a third surface having a low coefficient of friction; wherein the second surface abuts the third surface;
    placing the first IO device on the first and second surfaces; and
    placing the second IO device on the third surface.

10. The method of claim 9, wherein the platform defines a perimeter shaped generally as an oval.

11. The method of claim 9, wherein the second surface comprises a material selected from the group of neoprene and hook and loop fastener material.

12. An adjustable work surface for use on a chair arm, said chair arm having a top surface and a width dimension, said adjustable work surface comprising:
    an armchair stop configured for fastening to the chair arm;
    a platform defining a securing hole and a perimeter, wherein the platform comprises:
        a first surface disposed on the platform, the first surface having a first coefficient of friction, and
        a second surface disposed on the platform abutting the first surface, said second surface disposed along at least three quarters of said perimeter, the second surface having a second coefficient of friction greater than the first coefficient of friction; and
    a movable fastener having body and a head, the body passing through the securing hole into the armchair stop, wherein the platform is rotatably connected to the armchair stop by the movable fastener, and wherein the platform is movable from an approximately horizontal plane to an approximately vertical plane;
    whereby said first surface and said second surface are level and coplanar.

13. The work surface of claim 12, wherein the armchair stop is removable from the chair arm.

14. The work surface of claim 12, wherein a portion of the second surface is shaped as an arc.

15. The work surface of claim 12, wherein the second surface surrounds the first surface.

16. The work surface of claim 12, wherein the first surface comprises a resilient material and the second surface comprises a material selected from the group of neoprene and hook and loop fastener material.

* * * * *